US009768657B2

(12) United States Patent
Ogawa et al.

(10) Patent No.: US 9,768,657 B2
(45) Date of Patent: Sep. 19, 2017

(54) ROTATING ELECTRICAL MACHINE INCLUDING AN INSULATOR WITH A REINFORCING PORTION

(71) Applicant: Aisin Seiki Kabushiki Kaisha, Kariya-shi (JP)

(72) Inventors: Hiroomi Ogawa, Nagoya (JP); Shuji Hattori, Nagoya (JP); Shinya Sakakura, Toyota (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 158 days.

(21) Appl. No.: 14/793,875

(22) Filed: Jul. 8, 2015

(65) Prior Publication Data

US 2016/0028285 A1    Jan. 28, 2016

(30) Foreign Application Priority Data

Jul. 25, 2014  (JP) ................................. 2014-151980

(51) Int. Cl.
*H02K 3/34* (2006.01)
*H02K 3/48* (2006.01)
(Continued)

(52) U.S. Cl.
CPC ............. *H02K 3/345* (2013.01); *H02K 3/325* (2013.01); *H02K 3/34* (2013.01); *H02K 3/48* (2013.01);
(Continued)

(58) Field of Classification Search
CPC   H02K 3/34; H02K 3/345; H02K 3/48; H02K 3/487; H02K 3/52; H02K 3/32; H02K 2203/12; H02K 3/522; H02K 3/325
(Continued)

(56) References Cited

U.S. PATENT DOCUMENTS 8,222,790 B2    7/2012  Sakata
2010/0213784 A1   8/2010  Iizuka et al.
(Continued)

FOREIGN PATENT DOCUMENTS

CN    102111021 A    6/2011
JP    2008-92700    4/2008

OTHER PUBLICATIONS

Extended European Search Report issued Feb. 8, 2016 in Patent Application No. 15175033.8.

*Primary Examiner* — Joshua Benitez Rosario
*Assistant Examiner* — Alexander Singh
(74) *Attorney, Agent, or Firm* — Oblon, McClelland, Maier & Neustadt, L.L.P.

(57) ABSTRACT

A rotating electrical machine includes: a core including an annular yoke portion disposed while being centered around a rotation axis; toothed portions protruding from the yoke portion in a radial direction; and a tooth flange portion circumferentially sticking out from a protruding end of each of the toothed portions while being centered around the rotation axis; and an insulator covering a region from the toothed portion to the tooth flange portion, wherein the insulator includes a tooth cover portion, and a flange cover portion, and a reinforced portion is formed at the boundary between the tooth cover portion and the flange cover portion, and includes a first restricting surface, and a second restricting surface.

3 Claims, 10 Drawing Sheets

(51) Int. Cl.
     *H02K 3/52*          (2006.01)
     *H02K 3/487*       (2006.01)
     *H02K 3/32*          (2006.01)

(52) U.S. Cl.
     CPC ............... *H02K 3/487* (2013.01); *H02K 3/52* (2013.01); *H02K 3/522* (2013.01); *H02K 2203/12* (2013.01)

(58) Field of Classification Search
     USPC ........................................ 310/215, 216, 214
     See application file for complete search history.

(56) References Cited

U.S. PATENT DOCUMENTS

| | | | |
|---|---|---|---|
| 2011/0210640 A1 | 9/2011 | Elser | |
| 2011/0273053 A1 | 11/2011 | Oka et al. | |
| 2014/0363320 A1* | 12/2014 | Hayakawa | H02K 3/46 417/420 |

* cited by examiner

ROTATING ELECTRICAL MACHINE INCLUDING AN INSULATOR WITH A REINFORCING PORTION

CROSS REFERENCE TO RELATED APPLICATIONS

This application is based on and claims priority under 35 U.S.C. §119 to Japanese Patent Application 2014-151980, filed on Jul. 25, 2014, the entire contents of which are incorporated herein by reference.

TECHNICAL FIELD

This disclosure relates to a rotating electrical machine, specifically, to a technology of winding a coil strand around a plurality of toothed portions.

BACKGROUND DISCUSSION

In a rotating electrical machine with the aforementioned configuration disclosed in JP 2008-92700A (Reference 1), a stator is configured such that a plurality of toothed portions are formed on the inner circumference of a ring-shaped stator core, an insulator is disposed while overlapping the toothed portions, and a coil strand is wound around the toothed portions on which the insulator is disposed. In the rotating electrical machine disclosed in Reference 1, a flange-shaped portion is formed in a protruding end portion of the toothed portion in such a manner as to extend in a circumferential direction, and a coil slot is formed in a region surrounded by the internal surface of the stator core, the external surface of the toothed portion, and the flange-shaped portion of the toothed portion.

For example, a rotating electrical machine such as a brushless DC motor includes a core including an annular yoke portion disposed while being centered around a rotation axis; a plurality of toothed portions that protrude from the yoke portion in a radial direction; and a tooth flange portion that circumferentially sticks out from a protruding end of each of the plurality of toothed portions while being centered around the rotation axis.

In many cases, this rotating electrical machine also adopts a configuration in which an insulator made of resin is mounted in a region from the toothed portion to the tooth flange portion, and a coil strand is wound around a toothed portion of the insulator.

As disclosed in Reference 1, when the coil strand is wound around the toothed portion of the insulator, a wire needle is used to supply the coil strand from a tip end thereof, and tension is applied to the coil strand such that the occurrence of sagging is prevented during a winding operation. However, when the coil strand is wound around the toothed portion in a state where tension is applied to the wire strand, the tension of a post-winding coil strand is added to the tension of a pre-winding coil strand, and thus an excessive pressure is applied to the insulator, and the insulator may be cracked.

In many cases, this cracking may occur at the boundary between a portion of the insulator with which the toothed portion is covered, and a portion of the insulator with which the tooth flange portion is covered. The reason of this is that the pressure of the coil strand is concentrated at the boundary between the portion of the insulator with which the toothed portion is covered, and the portion of the insulator with which the tooth flange portion is covered. An increase in the thickness of the insulator may be considered as a countermeasure against this problem; however, if the thickness of the insulator is simply increased, the number of turns of the coil strand is reduced, and the performance of the rotating electrical machine is decreased. Therefore, there is room for improvement.

SUMMARY

Thus, a need exists for a rotating electrical machine which is not suspectable to the drawback mentioned above.

An aspect of the disclosure is directed to a rotating electrical machine including a core including an annular yoke portion disposed while being centered around a rotation axis; a plurality of toothed portions that protrude from the yoke portion in a radial direction; and a tooth flange portion that circumferentially sticks out from a protruding end of each of the plurality of toothed portions while being centered around the rotation axis; and an insulator that covers a region from the toothed portion to the tooth flange portion, in which the insulator includes a tooth cover portion which is disposed at a position to cover the outer circumference of the toothed portion, and around which a coil strand is wound, and a flange cover portion which is disposed at a position to cover the tooth flange portion, and a reinforced portion is formed at the boundary between the tooth cover portion and the flange cover portion, and includes a first restricting surface which comes into contact with a coil strand positioned in an end portion of a predetermined layer from multiple layers of the coil strand wound around the outer circumference of the tooth cover portion, and a second restricting surface which is gently inclined compared to the first restricting surface so as to enlarge a winding region of a layer of the coil strand wound over the predetermined layer.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed herein will be described with reference to the accompanying drawings.

Basic Configuration

Figure 1:
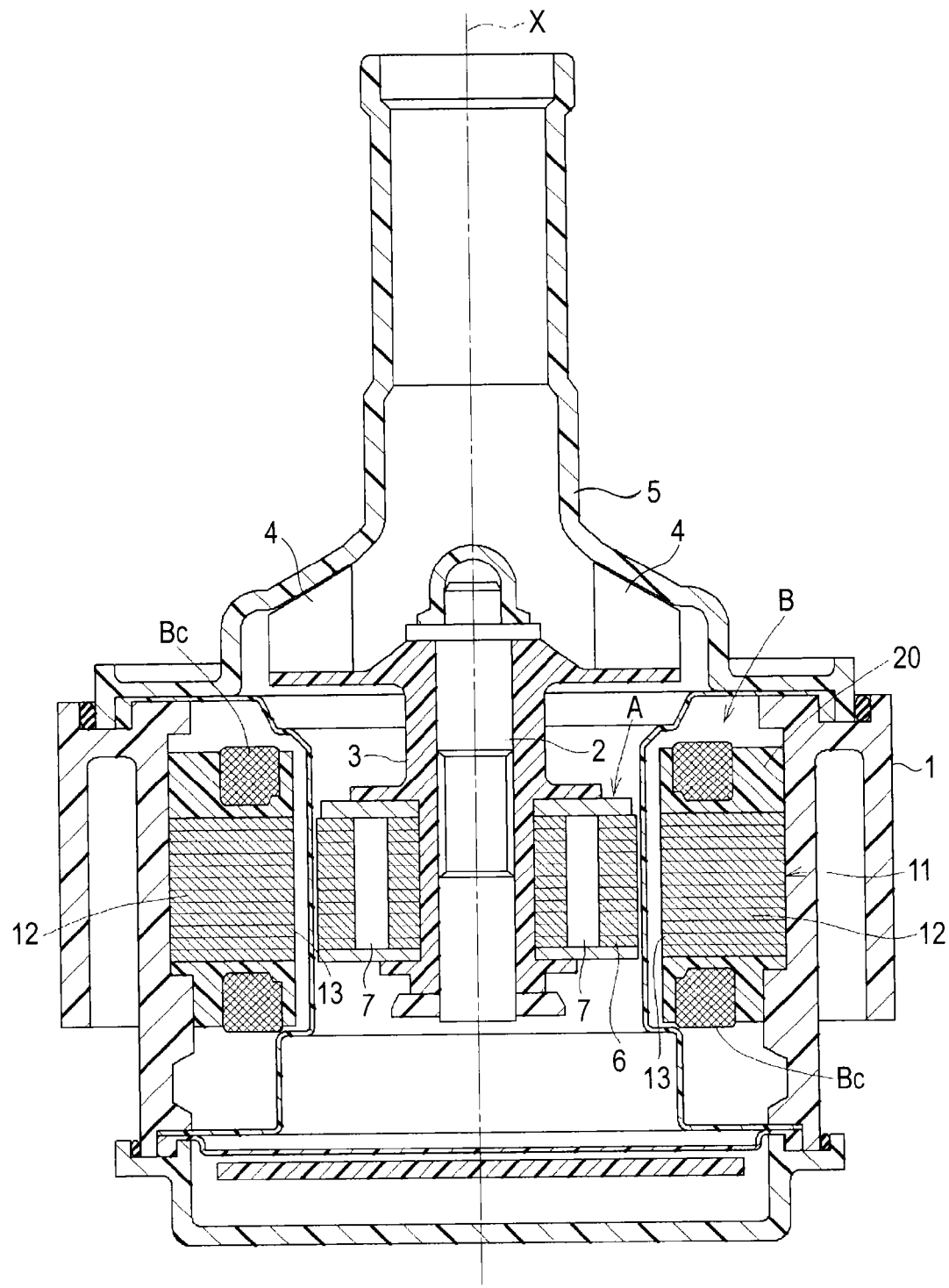
FIG. 1 is a sectional view of a water pump.

As illustrated in FIG. 1, a brushless electric motor as a rotating electrical machine is configured in such a manner as to include a support shaft 2, both ends of which are supported coaxially with a rotation axis X in a housing 1; a cylindrical rotary shaft 3 that can rotate while being fitted onto the external surface of the support shaft 2; a rotor A that rotates integrally with the rotary shaft 3; and a stator B disposed in a region that surrounds the rotor A.

The rotary shaft 3 is made of resin, and an impeller 4 is integrally formed at an end of the rotary shaft 3. In a state where the impeller 4 of the electric motor is accommodated in a water pump housing 5, the electric motor is used in a water pump that circulates coolant around an inverter, or circulates coolant between the engine and the radiator in a passenger vehicle or the like.

The brushless electric motor is exemplified as the rotating electrical machine; however, since the configuration of the electric motor is basically the same as the configuration of a three-phase motor, the rotating electrical machine may be configured as a three-phase motor. The motor with this configuration works as a generator when rotating the rotary shaft 3, and thus the configuration disclosed herein may be applied to a generator.

The rotor A includes a back yoke 6 that rotates integrally with the rotary shaft 3, and a plurality of permanent magnets 7 that are buried in the back yoke 6, and the entire rotor A is formed in a cylindrical shape. The back yoke 6 is configured such that magnetic steel sheets are stacked on top of each other, and the back yoke 6 is integrated with the rotary shaft 3 using resin.

Figure 2:
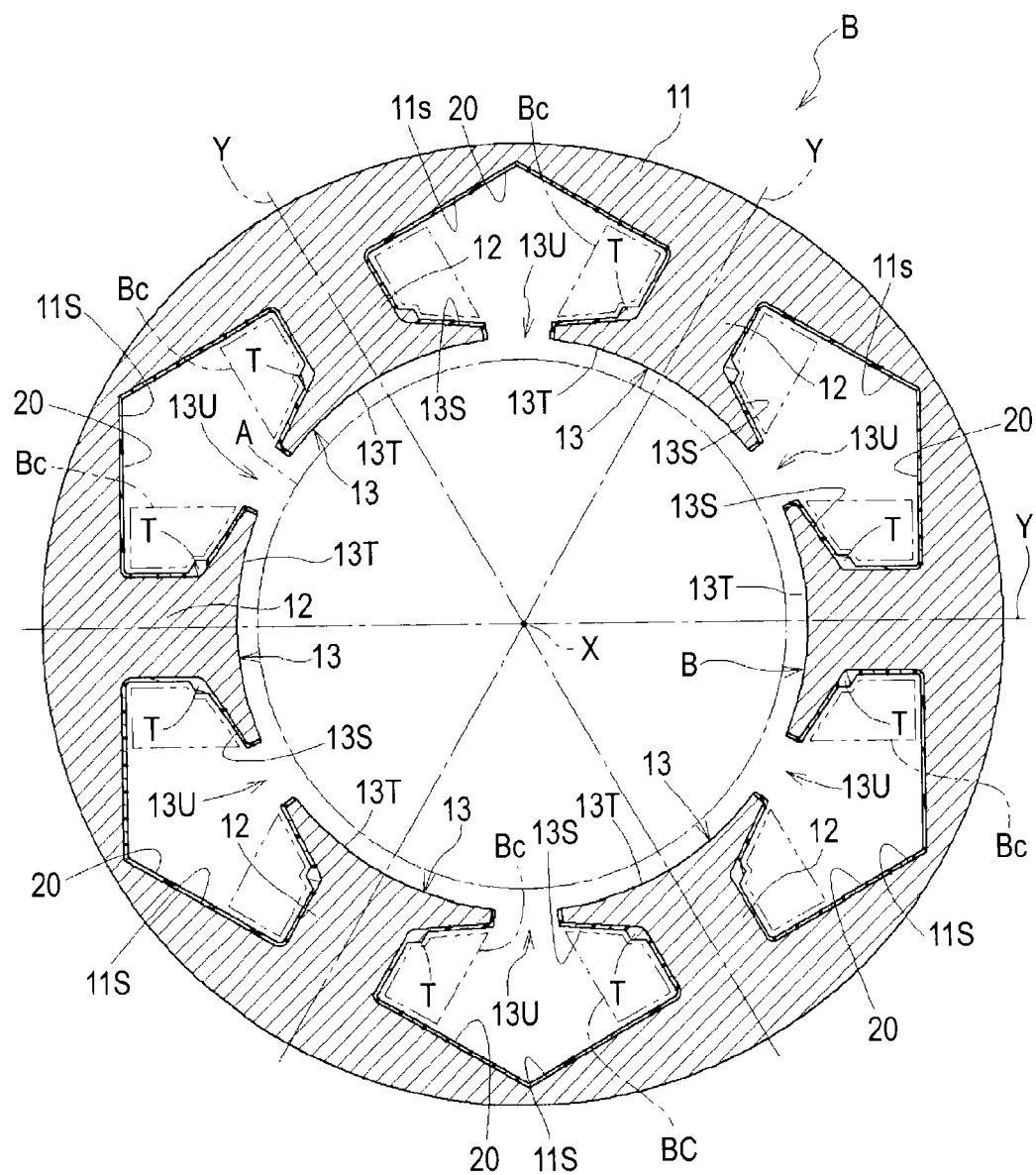
FIG. 2 is a sectional view of a yoke portion.
Figure 3:
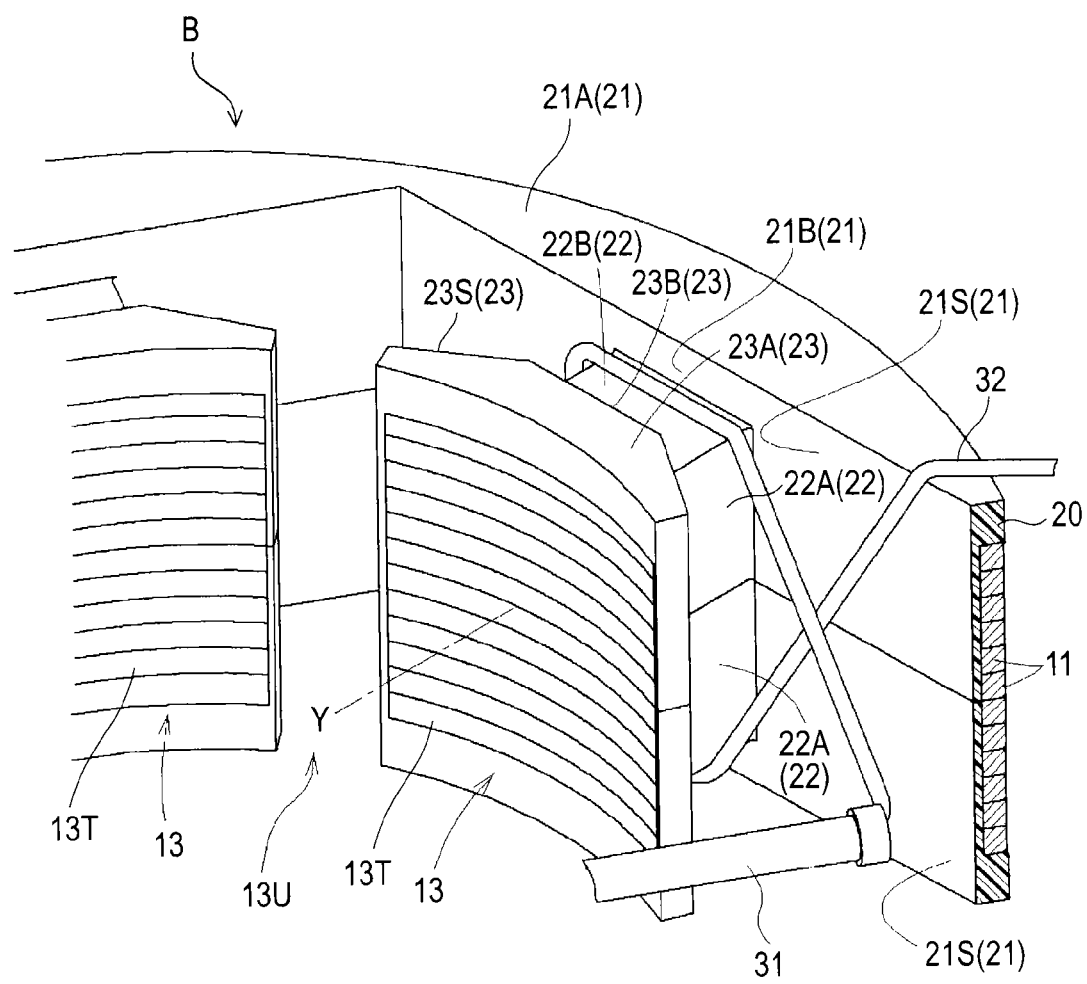
FIG. 3 is a perspective view illustrating a state in which a coil strand is wound around a toothed portion.
Figure 4:
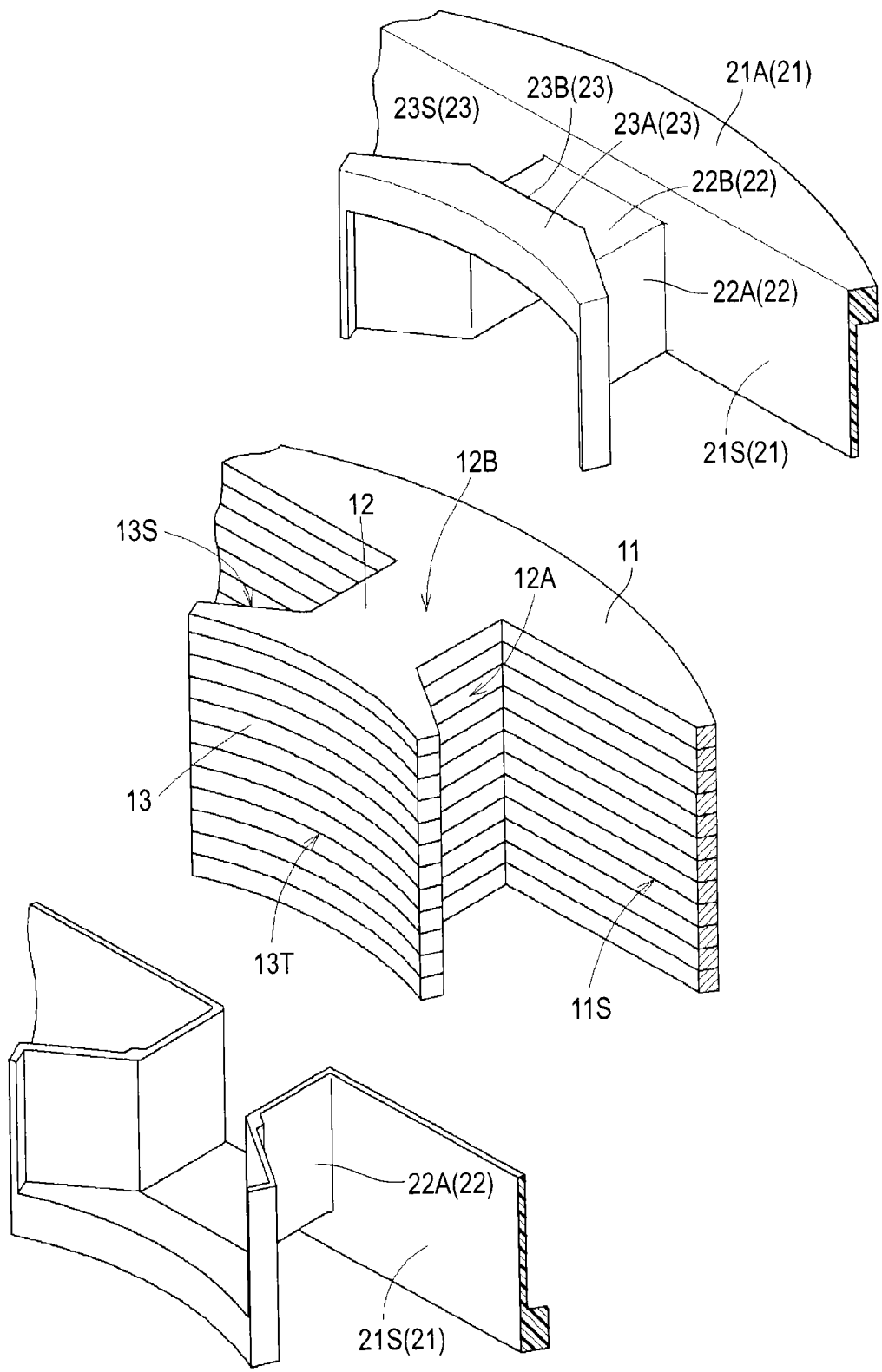
FIG. 4 is a perspective view illustrating a state in which the toothed portion is separated from an insulator.
Figure 5:
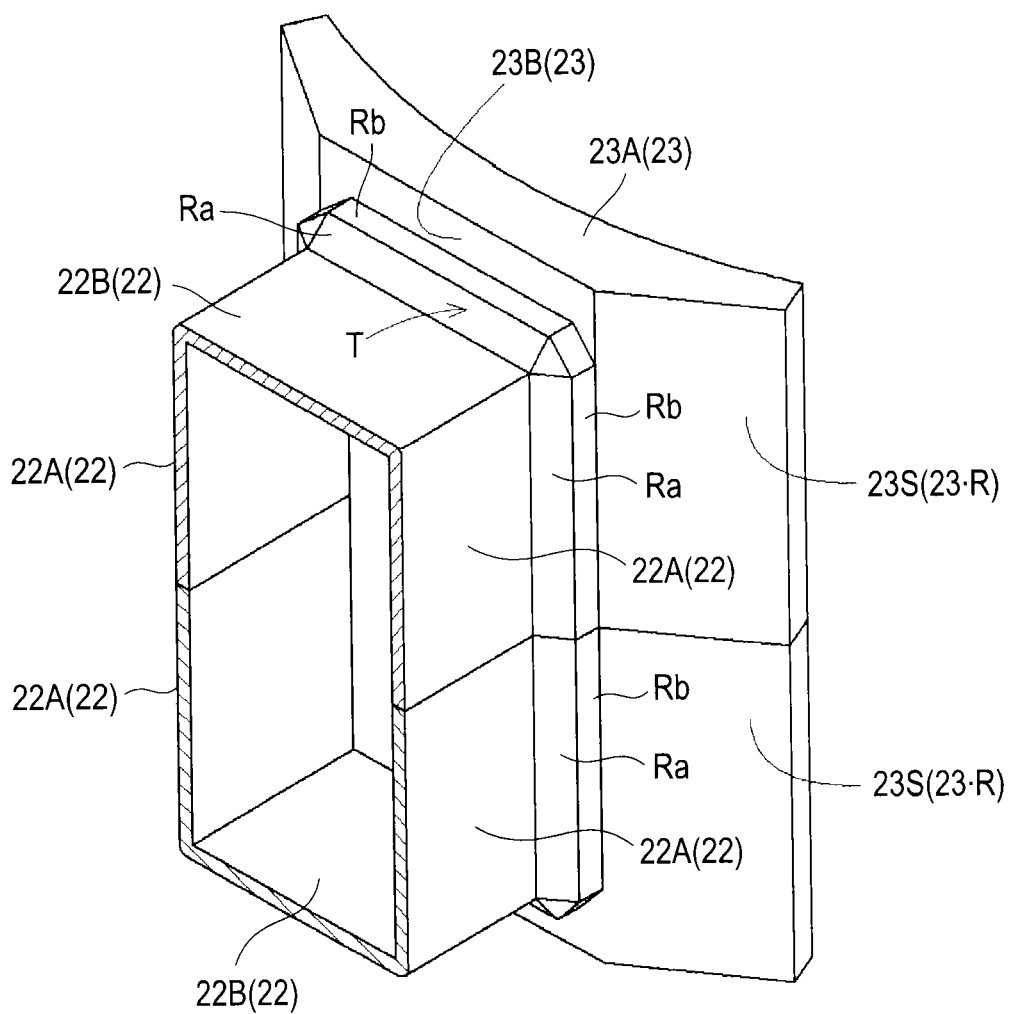
FIG. 5 is a perspective view illustrating the configuration of the insulator.
Figure 6:
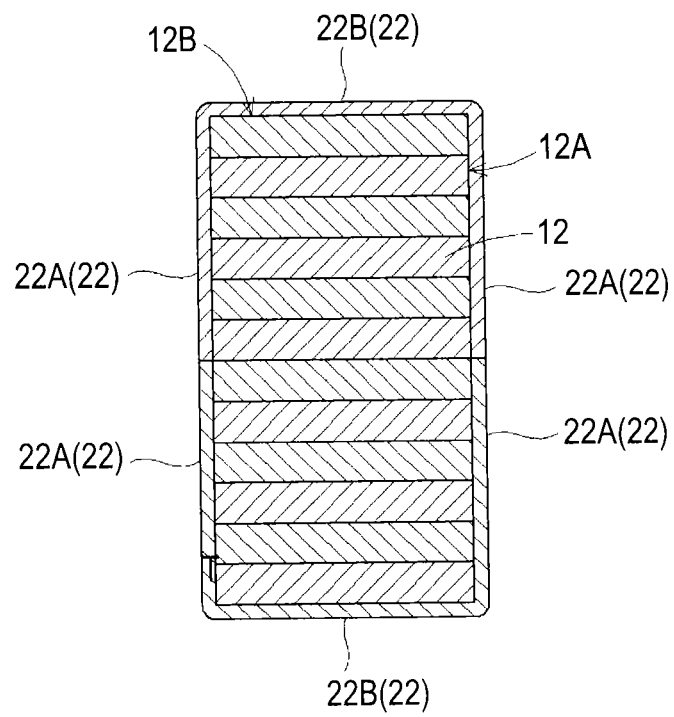
FIG. 6 is a sectional view of the toothed portion.

As illustrated in FIGS. 1 and 2, the stator B is configured as a core that includes a yoke portion 11 disposed in a ring-shaped region centered around the rotation axis X; six toothed portions 12 that protrude from the yoke portion 11 toward the rotation axis X; and tooth flange portions 13 that stick out from protruding ends of the plurality of toothed portions 12 in a circumferential direction, respectively. The yoke portion 11, the plurality of toothed portions 12, and the plurality of tooth flange portions 13 are configured such that magnetic steel sheets are stacked on top of each other.

An insulator 20 made of insulating resin is fitted onto the surfaces of the yoke portion 11, the plurality of toothed portions 12, and the plurality of tooth flange portions 13, and a coil Bc is formed such that a coil strand 32 is wound around a tooth cover portion 22 (refer to FIGS. 3 to 6) of the insulator 20, with which the toothed portions 12 are covered.

Two insulators 20 are used and disposed with the core interposed therebetween in a direction along the rotation axis X. The coil strand 32 in use is configured such that the surface of a copper wire with a circular section is coated with insulating resin such as polyurethane or polyester.

Details of Stator

As illustrated in FIGS. 2 to 6, the toothed portions 12 are respectively formed along radiating lines Y that radially extend with the rotation axis X as the center of a radiating pattern (radial direction). The toothed portion 12 includes a pair of vertical surfaces 12A positioned in parallel with the rotation axis X and the radiating line Y, and a pair of horizontal surfaces 12B positioned perpendicular to the radiating line Y (also positioned perpendicular to the rotation axis X), and the sectional shape of the toothed portion 12 is a rectangular shape. Specifically, the dimension (dimension in the direction along the rotation axis X) of the vertical surface 12A is set to be longer than the dimension (dimension in a direction perpendicular to the rotation axis X) of the horizontal surface 12B.

An internal yoke surface 11S is formed in a portion (portion connected to the toothed portion 12) of the yoke portion 11 in such a manner to be positioned perpendicular to the radiating line Y when seen in the direction along the rotation axis X, and the internal yoke surfaces 11S are respectively disposed on six sides of a regular hexagon centered around the rotation axis X.

Figure 11:
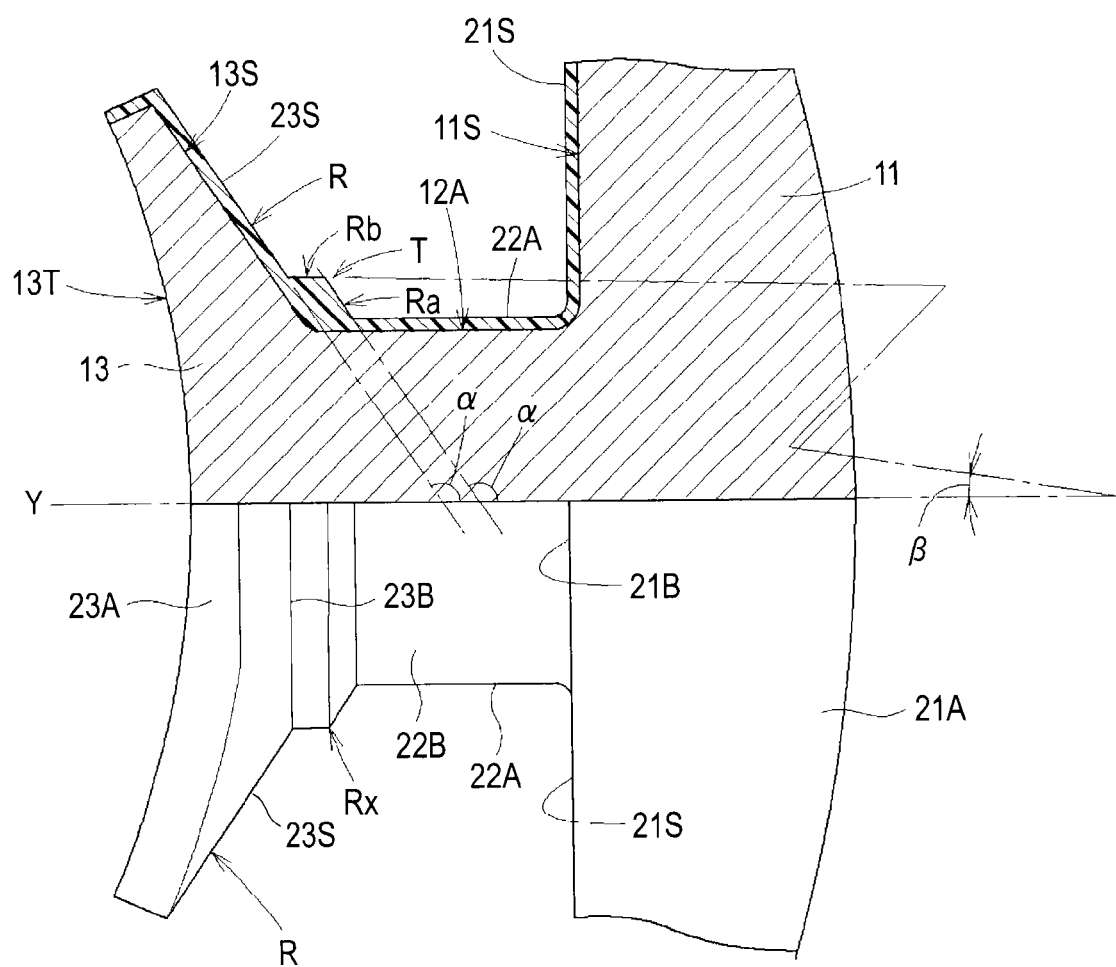
FIG. 11 is a sectional view illustrating the configuration of a reinforced portion.

As illustrated in FIG. 11, an internal flange surface 13S (surface facing the yoke portion 11) of the tooth flange portion 13 is formed in an inclining posture in which the internal flange surface 13S moves away from the internal yoke surface 11S when approaching a circumferential extending end of the tooth flange portion 13 when seen in the direction along the rotation axis X, and an inclination angle $\alpha$ formed by the internal flange surface 13S and the radiating line Y (an example of a radial line) is set to 120 degrees. As illustrated in FIG. 2, an external flange surface 13T of the tooth flange portion 13 toward the rotation axis X is molded into a circular arched shape along the outer circumference of the rotor A, and a flange gap 13U is formed between the adjacent portions of the plurality of tooth flange portions 13.

Insulator

As illustrated in FIGS. 3 to 6, the insulator 20 has a configuration in which a yoke cover portion 21, the tooth cover portion 22, and a flange cover portion 23 are integrally formed. Here, the yoke portion 11 is covered with the yoke cover portion 21, the toothed portion 12 is covered with the tooth cover portion 22, and the tooth flange portion 13 is covered with the flange cover portion 23.

The yoke cover portion 21 includes an internal surface cover wall 21S with which the internal yoke surface 11S is covered, and a base-end cover wall 21A with which an end surface (surface perpendicular to the rotation axis X) of the yoke portion 11 is covered. The tooth cover portion 22 includes a vertical surface cover wall 22A with which the vertical surfaces 12A of the toothed portion 12 are covered, and a horizontal surface cover wall 22B with which the horizontal surface 12B of the toothed portion 12 is covered. The flange cover portion 23 includes a flange cover wall 23S with which the internal flange surface 13S is covered, and a tip-end cover wall 23A with which an end surface (surface perpendicular to the rotation axis X) of the tooth flange portion 13 is covered.

The yoke cover portion 21 includes the base-end cover wall 21A, and a base end wall 21B positioned perpendicular to the horizontal surface cover wall 22B of the tooth cover portion 22 (positioned in parallel with the rotation axis X). The flange cover portion 23 includes the tip-end cover wall 23A, and a tip end wall 23B positioned perpendicular to the horizontal surface cover wall 22B of the tooth cover portion 22 (positioned in parallel with the rotation axis X).

The base end wall 21B and the tip end wall 23B are formed in the shape of a wall by increasing the thickness of the insulator 20, and the base end wall 21B and the tip end wall 23B work to determine winding limitation in the direction of the radiating line Y when the coil strand 32 is wound around the outer circumference of the tooth cover portion 22, and to prevent multiple layers of the coil strand 32 from collapsing.

A coil slot is formed in a region surrounded by the vertical surface cover wall 22A, the internal surface cover wall 21S, and the flange cover wall 23S, and when the coil strand 32 is wound around the external surface of the tooth cover portion 22 of the insulator 20, the coil Bc is accommodated in the coil slot.

A coil winding region is formed on the insulator 20, and multiple layers of the coil strand 32 are wound around the external surface of the tooth cover portion 22 in the coil winding region. This coil winding region can be defined as the distance over which the coil strand 32 can be wound in a flow direction (direction along the radiating line Y) of the yoke portion 11. When the multiple layers of the coil strand 32 are wound in the coil winding region, the coil strands 32 come into contact with the base-end internal surface cover wall 21S of the yoke portion 11 and the base end wall 21B, and come into contact with the flange cover wall 23S and the tip end wall 23B on a tip end side of the yoke portion 11.

The flange cover wall 23S of the flange cover portion 23 is formed as a restricting surface R that comes into contact with and restricts the coil strand 32.

In particular, when the multiple layers of the coil strand 32 are wound in the coil winding region, tension is applied to the multiple layers of the coil strand 32 while being superimposed on each other. Therefore, considerable stress induced by the tension of the coil strands 32 is applied to the boundary between the vertical surface cover wall 22A and the flange cover wall 23S of the insulator 20, and cracking may occur at the boundary.

In the embodiment disclosed herein, it is possible to disperse stress by forming a thick reinforced portion T at the boundary, and setting a surface shape for the reinforced portion T so that the occurrence of cracking at the boundary can be prevented.

As illustrated in FIGS. 5 and 9 to 11, the reinforced portions T are respectively formed in portions of the insulator 20 adjacent to the flange cover wall 23S and the tip end wall 23B. That is, one of the reinforced portions T is formed by setting the thickness of a portion (portion adjacent to the vertical surface cover wall 22A) of the flange cover wall 23S to be greater than those of other portions of the flange cover wall 23S. The other of the reinforced portions T is formed by setting the thickness of a portion (portion adjacent to the horizontal surface cover wall 22B) of the tip end wall 23B to be greater than those of other portions of the tip end wall 23B.

The forming of the reinforced portions T in the portions of the insulator 20 adjacent to the flange cover wall 23S and the horizontal surface cover wall 22B is sufficient to reinforce the insulator 20; however, the reinforced portions T are formed in a region, which surrounds the entire circumference of the yoke cover portion 21, so as to guarantee a good quality of the winding of the coil strand 32.

As a result of the formation of the reinforced portions T, a first restricting surface Ra is formed in a region continuous with the vertical surface cover wall 22A, and a second restricting surface Rb is formed in a region that starts from the first restricting surface Ra and is continuous with the flange cover wall 23S. In particular, the boundary between the first restricting surface Ra and the second restricting surface Rb is formed as a curved surface Rx that is smoothly continuous with the first restricting surface Ra and the second restricting surface Rb, and the section of the boundary therebetween is shaped in such a manner as not to cause damage to or the disconnection of the coil strand 32 while being wound.

In the embodiment, the first restricting surface Ra is formed in a region in which the first restricting surface Ra is in contact with the coil strand 32 in an end portion of each of a first layer L1 and a second layer L2. The second restricting surface Rb is formed in a region in which a third layer of the coil strand 32 is in contact with the second restricting surface Rb. The first restricting surface Ra is inclined at the same angle (120 degrees) as the inclination angle α formed by the internal flange surface 13S and the radiating line Y, and the second restricting surface Rb is inclined such that an angle β formed by the second restricting surface Rb and the radiating line Y is greater than the inclination angle α. Since the first restricting surface Ra is inclined at the inclination angle α, when the first layer L1 of the coil strand 32 and the second layer L2 of the coil strand 32 are densely wound, the first layer L1 of the coil strand 32 and the second layer L2 of the coil strand 32 are in contact with the first restricting surface Ra at an equal pressure.

That is, it is possible to wind the coil strands 32 in a determined region by virtue of contact between the first restricting surface Ra and the first layer L1 of the coil strand 32, and contact between the first restricting surface Ra and the second layer L2 of the coil strand 32. The third layer of the coil strand 32 is in contact with the second restricting surface Rb, and a region (winding region of the coil strand 32), in which the coil strand 32 is wound, is enlarged compared to the winding region of the first layer L1 and the second layer L2.

Winding State of Coil Strand

When the coil strand 32 is wound around the stator B, a dedicated winding apparatus is used, the coil strand 32 is supplied from a tip end of a nozzle 31 of the winding apparatus, and control for moving the stator B and the nozzle 31 relative to each other is performed. When the coil strand 32 is wound around the tooth cover portion 22, the winding apparatus can set a winding position in a protruding direction (direction along the radiating line Y) of the toothed portion 12, and this setting allows the coil strand 32 to be densely wound. The winding of the coil strand 32 is performed in a state in which a set tension is applied to the coil strand 32.

Figure 7:
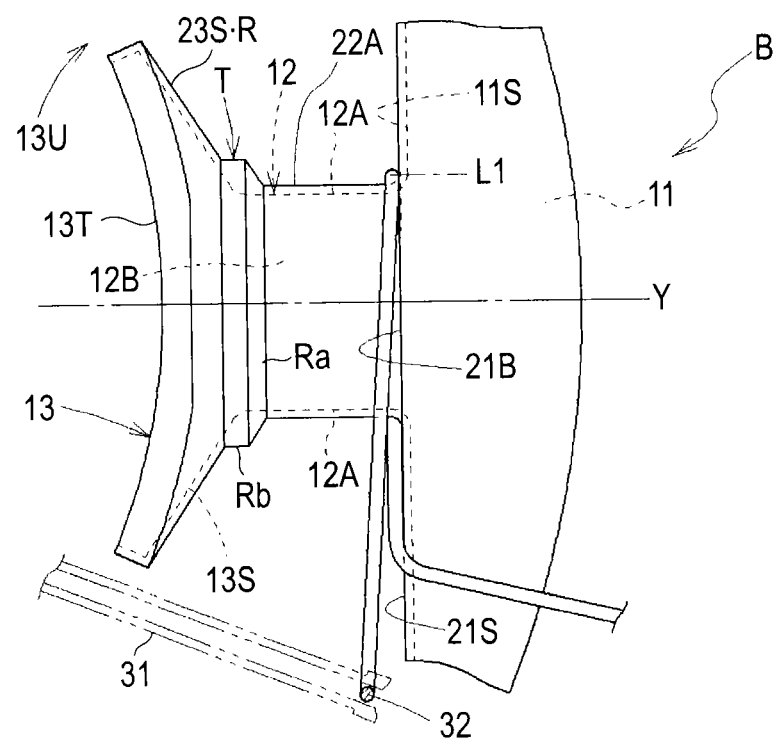
FIG. 7 is a view illustrating when the winding of a first layer of the coil strand is started.
Figure 8:
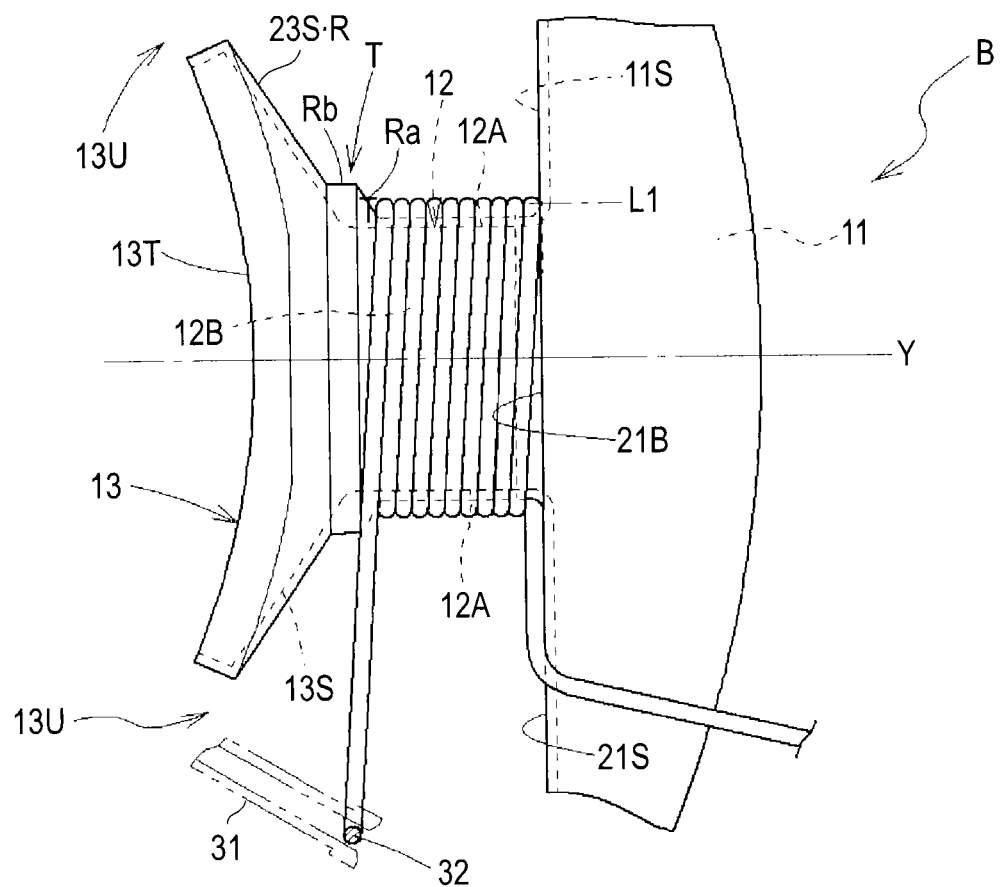
FIG. 8 is a view illustrating when the winding of the first layer of the coil strand is in progress.
Figure 9:
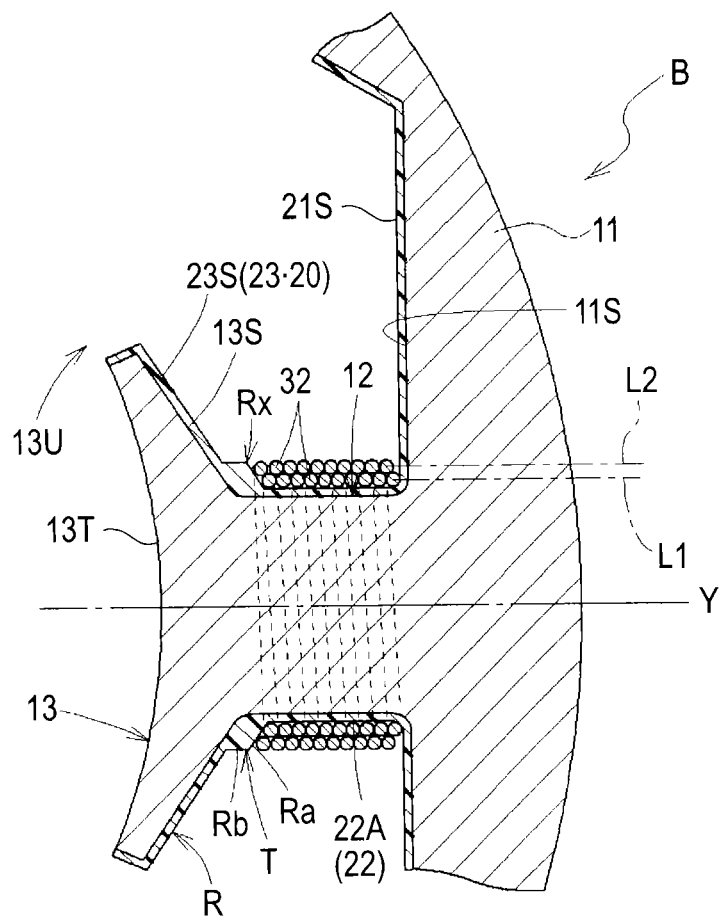
FIG. 9 is a sectional view illustrating when the final winding of a second layer of the coil strand is performed.

When the first layer L1 of the coil strand 32 is wound around the tooth cover portion 22, as illustrated in FIG. 7, the winding of the coil strand 32 is started from the position of a base end (the position of the base-end cover wall 21A) of the toothed portion 12, and a winding position moves toward the tooth flange portion 13. As illustrated in FIG. 8, the first layer L1 continues to a winding position in which the coil strand 32 comes into contact with the first restricting surface Ra, and when the coil strand 32 comes into contact with the first restricting surface Ra, a force is applied to the coil strands 32 such that the coil strands 32 come into close contact with each other. Accordingly, even if there is a gap between adjacent coil strands 32 in the first layer L1, a pressure from the first restricting surface Ra brings the first layer L1 of the adjacent coil strands into contact with each other, in other words, the coil strands 32 are densely wound.

Figure 10:
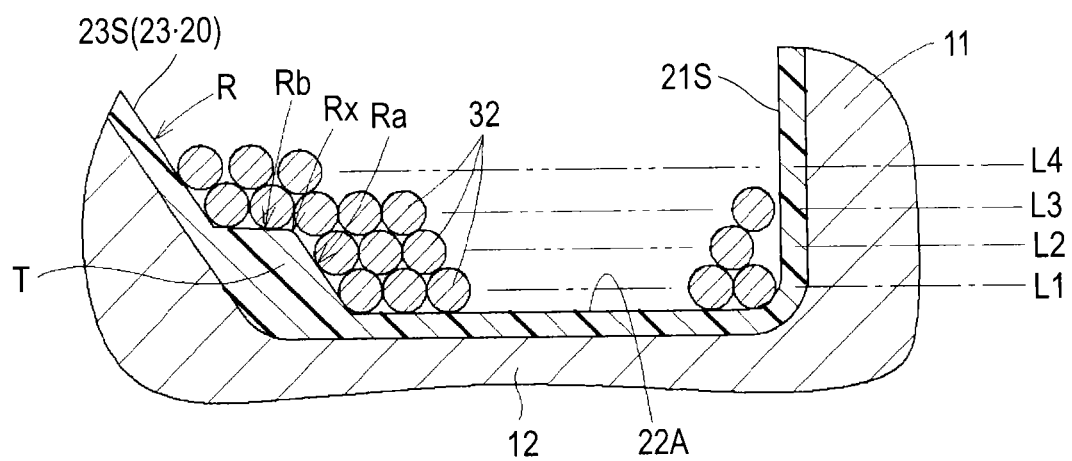
FIG. 10 is a sectional view illustrating when a third layer of the coil strand is wound.

When the second layer L2 of the coil strand 32 is wound, as illustrated in FIG. 10, an upper layer of the coil strand 32 overlaps the first layer L1 of the coil strand 32, and a winding position moves from a position (position in which the coil strand 32 is in contact with the first restricting surface Ra) toward the position of the base end of the toothed portion 12. When this winding is performed, the second layer L2 of the coil strand 32 is wound around a valley-like portion between adjacent coil strands 32 in the first layer L1, and the windings are at a pitch required to densely wind adjacent coil strands 32. The winding in the second layer L2 is continuously performed from the first restricting surface Ra to a location in which the coil strand 32 comes into contact with the base end (the position of the base-end cover wall 21A) of the toothed portion 12. Accordingly, the winding is performed in such a manner that the number of turns of the coil strand 32 in the second layer L2 is substantially the same as that of the coil strand 32 in the first layer L1.

Subsequently, when a third layer L3 of the coil strand 32 is wound, an upper layer of the coil strand 32 overlaps the second layer L2 of the coil strand 32, the winding of the coil strand 32 is started from the base end (the position of the base-end cover wall 21A) of the toothed portion 12, and a winding position moves toward the position of the tooth flange portion 13.

When the third layer L3 of the coil strand 32 is wound, the winding of the coil strand 32 is started from the base end of the toothed portion 12, and a winding position moves toward the tooth flange portion 13 while a movement pitch is set in such a manner that the coil strand 32 is densely wound. However, in many cases, even if the movement pitch is determined such that the third layer L3 of the coil strand 32 is densely wound, the gap between the coil strands 32 is increased, and the gaps therebetween are not uniform. Accordingly, as illustrated in FIG. 10, in a state where the winding position reaches the second restricting surface Rb, and the gaps between the coil strands are not uniform, the winding is performed until the coil strand 32 reaches a restricting surface R even after coming into contact with the second restricting surface Rb.

When the third layer L3 of the coil strand 32 is wound, a winding region is enlarged, and thus the number of turns of the coil strand 32 is set to be greater than that of the coil strand 32 in the first layer L1 and the second layer L2.

Thereafter, when a fourth layer L4 of the coil strand 32 is wound, a winding position moves from the restricting surface R toward the base end of the toothed portion 12, the coil strand 32 is continuously wound until coming into contact with the internal surface cover wall 21S, and the number of turns of the coil strand 32 in the fourth layer L4 is set to be the same as that of the coil strand 32 in the third layer L3. FIG. 10 illustrates up to fourth layer L4; however, actually, multiple layers of the coil strand 32 are wound, and the tension of a post-winding coil strand 32 (the second layer L2 of the coil strand 32) is added to the tension of a pre-winding coil strand 32 (the first layer L1 of the coil strand 32). Therefore, a large pressure from a lower layer of the coil strand 32 is applied to the insulator 20. However, it is difficult to densely wind upper layers of the coil strand 32 (upper layers over the third layer L3), a winding tension is applied to only these wound coil strands, and in contrast, a pressure to that extent is not applied to lower layers of the coil strands 32, and a pressure from the coil strand 32 is not applied in a longitudinal direction of the yoke portion 11. Accordingly, a pressure applied to the insulator 20 is reduced.

EFFECTS OF EMBODIMENT

In the electric motor (rotating electrical machine) disclosed herein, the reinforced portions T are formed in a region located to correspond to the first layer L1 and the second layer L2, and are portions of the insulator 20 that cover the yoke portion 11, the toothed portion 12, and the tooth flange portion 13 of the core. Accordingly, the occurrence of cracking in the insulator 20 is prevented by reinforcing the portions of the insulator 20, to which a strong pressure is applied from the coil strands 32.

In particular, since the first restricting surface Ra of the reinforced portion T is formed in an inclined surface positioned in parallel with the restricting surface R, when the first layer L1 of the coil strand 32 is wound, a winding pressure is applied in the longitudinal direction (direction along the radiating line Y, that is, the radial line) of the yoke portion 11. Therefore, it is possible to reduce the gap between adjacent coil strands 32, and to densely wind the coil strand 32. Since the first restricting surface Ra is made in a size corresponding to the sizes of the first layer L1 and the second layer L2, the thick first restricting surface Ra can rigidly receive a force in the longitudinal direction of the yoke portion 11 when the coil strand 32 is densely wound.

In addition, even if upper layers (the third layer L3 and above) of the coil strand 32 come into direct contact with the restricting surface R of the flange cover wall 23S, almost no pressure is applied to the flange cover wall 23S from the coil strand 32, and thus it is possible to use the flange cover wall 23S with a thin wall thickness. In this configuration, since it is possible to decrease a sectional area of the reinforced portion T, it is possible to prevent a reduction in the sectional area of the coil slot, and a reduction in the number of turns of the coil strand 32.

Other Embodiments

This disclosure may have any one of the following configurations other than that in the aforementioned embodiment.

(a) The inclination angles of the first restricting surface Ra and the tooth flange portion 13 are preferably set in such a manner that the first restricting surface Ra is parallel to the tooth flange portion 13; however, the first restricting surface Ra is not necessarily parallel to the tooth flange portion 13. The angle β formed by the second restricting surface Rb and the radiating line Y (an example of the radial line) may be arbitrarily set in a range of 120 degrees to 180 degrees.

(b) The first restricting surface Ra is formed in a size corresponding to the sizes of the first layer L1 to the fourth layer L4. In this configuration, the first layer L1 to the fourth layer L4 of the coil strand 32 can be densely wound, and it is possible to obtain the effects of good reinforcement.

Figure 12:
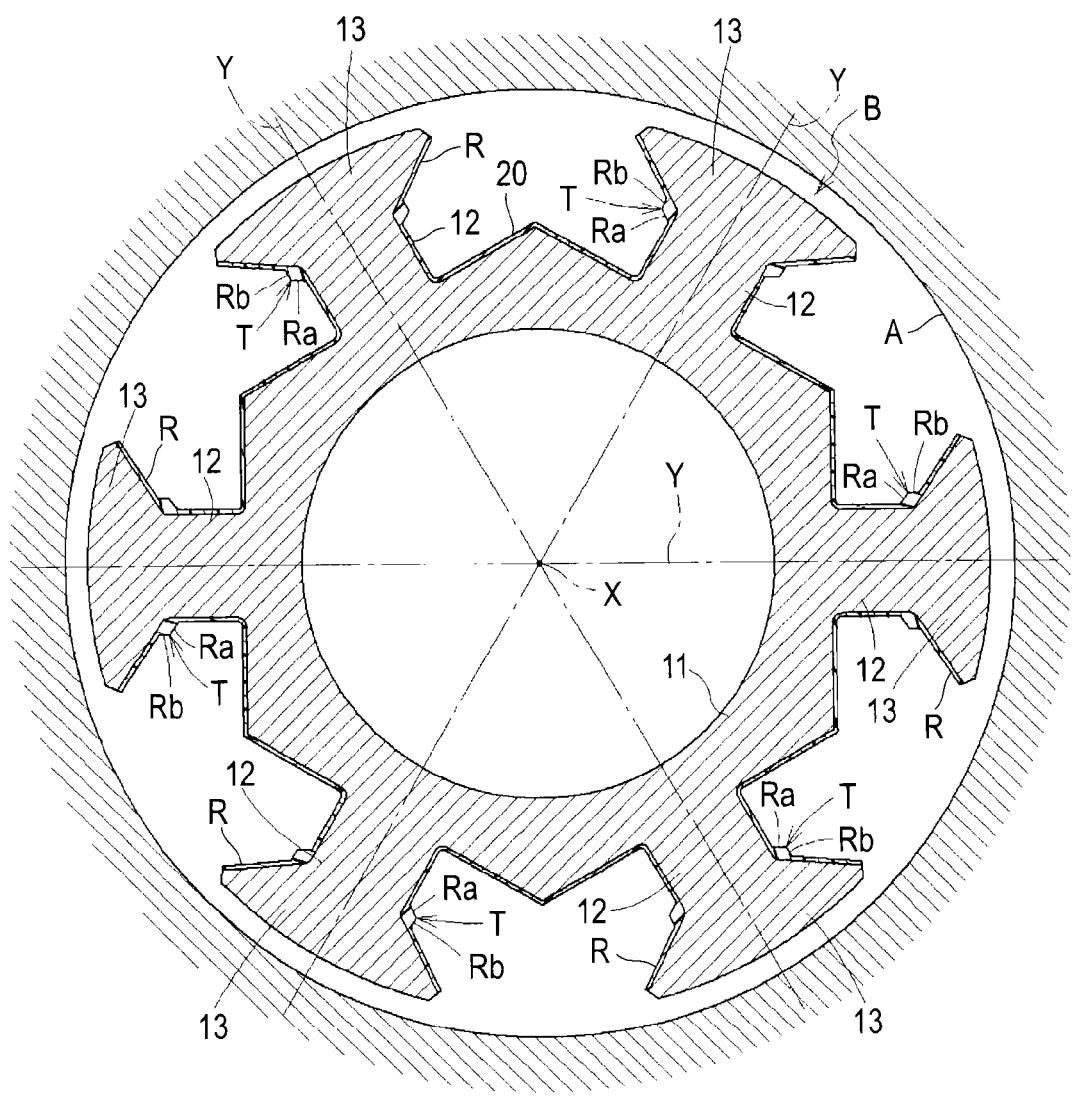
FIG. 12 is a sectional view illustrating a yoke portion in another embodiment (c).

(c) As illustrated in FIG. 12, the restricting surface R disclosed herein is formed in the stator B with a structure in which the plurality of toothed portions 12 are formed in such a manner as to extend outwards from an outer circumferential position of the annular yoke portion 11, and the tooth flange portion 13 is formed in a protruding end portion of each of the toothed portions 12.

In the other embodiment (c), the rotor A, which applies a magnetic field, is formed in a ring shape, and also in an electric motor with such a configuration, the reinforced portions T are formed in the insulator 20, and the insulator 20 is reinforced when the first restricting surface Ra and the second restricting surface Rb are formed in the reinforced portions T.

An aspect of the disclosure is directed to a rotating electrical machine including a core including an annular yoke portion disposed while being centered around a rotation axis; a plurality of toothed portions that protrude from the yoke portion in a radial direction; and a tooth flange portion that circumferentially sticks out from a protruding end of each of the plurality of toothed portions while being centered around the rotation axis; and an insulator that covers a region from the toothed portion to the tooth flange portion, in which the insulator includes a tooth cover portion which is disposed at a position to cover the outer circumference of the toothed portion, and around which a coil strand is wound, and a flange cover portion which is disposed at a position to cover the tooth flange portion, and a reinforced portion is formed at the boundary between the tooth cover portion and the flange cover portion, and includes a first restricting surface which comes into contact with a coil strand positioned in an end portion of a predetermined layer from multiple layers of the coil strand wound around the outer circumference of the tooth cover portion, and a second restricting surface which is gently inclined compared to the first restricting surface so as to enlarge a winding region of a layer of the coil strand wound over the predetermined layer.

In this configuration, when the predetermined layer of the coil strand is wound around the outer circumference of the tooth cover portion, the predetermined layer of the coil strand comes into contact with the first restricting surface. When the coil strand is wound over the predetermined layer, the coil strand is wound to a position in contact with the second restricting surface that is displaced closer to the tooth flange portion of the core than the first restricting surface. That is, in an example of this configuration illustrated in FIG. 10, a thick reinforced portion T with a first restricting surface Ra and a second restricting surface Rb is formed in an insulator 20. In this configuration, when a pressure from a coil strand 32, positioned in an end portion and wound around a vertical surface cover wall 22A of the insulator 20, is applied in a longitudinal direction (in a rightward and leftward direction in FIG. 10) of a toothed portion 12, the reinforced portion T can receive this pressure. Since the gap between adjacent coil strands 32, wound over the predetermined layer, tends to be increased, a pressure is not applied in the longitudinal direction of the toothed portion 12. For this reason, the second restricting surface Rb may work to receive the coil strand 32, and it is possible to prevent a reduction in the number of turns of the coil strand 32 without providing a thick wall portion for improving the strength of the insulator 20.

Accordingly, it is possible to configure the rotating electrical machine with a high-strength core insulator while securing a number of turns of the coil strand.

In the aspect of this disclosure, the boundary between the first restricting surface and the second restricting surface may be molded into a curved surface that is smoothly continuous with the first restricting surface and the second restricting surface.

With this configuration, for example, when the coil strand comes into contact with the boundary between the first restricting surface and the second restricting surface, the boundary does not cause the concentration of a pressure in the coil strand compared to when an edge is formed at the boundary. When an edge is formed at the boundary, the coil strand comes into contact with, and is caught at the edge, and it is difficult for the coil strand to be displaced, and in contrast, when the boundary is molded into a smooth curved surface, the coil strand can smoothly slide against the boundary, and an excessive tension is not applied to the boundary. Accordingly, it is possible to prevent the occurrence of disconnection of the coil strand by eliminating the concentration of a pressure at the boundary or the application of an excessive tension to the boundary.

In the aspect of this disclosure, a first layer, a second layer, and a third layer may be formed in the winding region, the first layer of the coil strand is wound starting from the position of a base end adjacent to the yoke portion to a location in which a winding position reaches the first restricting surface, the second layer of the coil strand is wound from the first restricting surface to a location in which a winding position reaches the position of the base end, while overlapping the first layer, and the third layer of the coil strand is wound from the position of the base end to a location in which a winding position reaches the second restricting surface, while overlapping the second layer, and the predetermined layer may be the second layer.

The dense winding of the coil strand is ideal; however, it is possible to maintain a dense winding state only in lower layers, and actually, in the third layer or the fourth layer, it is difficult to densely wind the coil strand, and the gap between adjacent coil strands is increased. When the winding of the coil strand is started from a position adjacent to the yoke portion, the gap between the coil strands in the third layer or between the coil strands in the fifth layer among layers of the coil strand in contact with the second restricting surface is increased. For this reason, the gap between the coil strands is non-uniformly increased by bringing the second layer of the coil strand into contact with the first restricting surface, and the third layer of the coil strand into contact with the second restricting surface. Therefore, it is possible to decrease the size of the reinforced portion.

In the aspect of this disclosure, the first restricting surface is inclined at an inclination angle of 120 degrees relative to a radial line along an extending direction of the toothed portion, and the second restricting surface is inclined at an angle in a range of 120 degrees to 180 degrees relative to the radial line.

With this configuration, for example, when the first layer of the coil strand is densely wound around the outer surface of the toothed portion of the insulator, and the second layer of the coil strand is densely wound over the first layer, the second layer of the coil strand is wound around the valley-like portion between the coil strands in the first layer. When the first layer and the second layer are formed in this manner, and the first restricting surface is inclined at an inclination angle of 120 degrees relative to the radial line along the extending direction of the toothed portion, the first layer of the coil strand and the second layer of the coil strand can come into contact with the first restricting surface without gaps therebetween. Since the second restricting surface in contact with the third layer of the coil strand is inclined at an inclination angle greater than that of the first restricting surface, it is possible to wind the coil strand without difficulty.

This disclosure can be used in a rotating electrical machine with a configuration in which a coil strand is wound around an insulator that covers toothed portions and tooth flange portions of a core.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:
1. A rotating electrical machine comprising:
   a core including an annular yoke portion disposed while being centered around a rotation axis; a plurality of toothed portions that protrude from the yoke portion in a radial direction; and a tooth flange portion that circumferentially sticks out from a protruding end of each of the plurality of toothed portions while being centered around the rotation axis; and
   an insulator that covers a region from the toothed portion to the tooth flange portion, wherein the insulator includes a tooth cover portion which is disposed at a position to cover the outer circumference of the toothed portion, and around which a coil strand is wound, and a flange cover portion which is disposed at a position to cover the tooth flange portion, wherein a reinforced portion is formed at the boundary between the tooth cover portion and the flange cover portion, and includes a first restricting surface which comes into contact with a coil strand positioned in an end portion of a predetermined layer from multiple layers of the coil strand wound around the outer circumference of the tooth cover portion, and a second restricting surface which is gently inclined compared to the first restricting surface so as to enlarge a winding region of a layer of the coil strand wound over the predetermined layer, and wherein a first layer, a second layer, and a third layer are formed in the winding region, the first layer of the coil strand is wound starting from the position of a base end adjacent to the yoke portion to a location in which a winding position reaches the first restricting surface, the second layer of the coil strand is wound from the first restricting surface to a location in which a winding position reaches the position of the base end, while overlapping the first layer, and the third layer of the coil strand is wound from the position of the base end to a location in which a winding position reaches the second restricting surface, while overlapping the second layer, and the predetermined layer is the second layer.

2. The rotating electrical machine according to claim 1, wherein the boundary between the first restricting surface and the second restricting surface is molded into a curved surface that is smoothly continuous with the first restricting surface and the second restricting surface.

3. The rotating electrical machine according to claim 1, wherein the first restricting surface is inclined at an inclination angle of 120 degrees relative to a radial line along an extending direction of the toothed portion, and the second restricting surface is inclined at an angle in a range of 120 degrees to 180 degrees relative to the radial line.

* * * * *